United States Patent
Hsieh et al.

(10) Patent No.: US 10,056,762 B2
(45) Date of Patent: Aug. 21, 2018

(54) BATTERY MANAGEMENT SYSTEM HAVING CAPABILITY FOR ADDRESSING AND TIME-DIVISION COMMUNICATION

(71) Applicant: CYBER POWER SYSTEMS, INC., Taipei (TW)

(72) Inventors: Hung-Ming Hsieh, Taipei (TW); Yung-Hao Peng, Taipei (TW); Ta-Peng Chen, Taipei (TW)

(73) Assignee: CYBER POWER SYSTEMS, INC., Taipei (TW)

(*) Notice: Subject to any disclaimer, the term of this patent is extended or adjusted under 35 U.S.C. 154(b) by 233 days.

(21) Appl. No.: 15/259,730

(22) Filed: Sep. 8, 2016

(65) Prior Publication Data

US 2017/0126014 A1    May 4, 2017

(30) Foreign Application Priority Data

Nov. 3, 2015  (TW) .............................. 104136136 A

(51) Int. Cl.
| | |
|---|---|
| *G05D 17/00* | (2006.01) |
| *H02J 4/00* | (2006.01) |
| *G05B 15/02* | (2006.01) |
| *H04L 5/00* | (2006.01) |
| *H04L 29/12* | (2006.01) |
| *H04L 29/06* | (2006.01) |
| *H04L 29/08* | (2006.01) |

(52) U.S. Cl.
CPC ............... *H02J 4/00* (2013.01); *G05B 15/02* (2013.01); *H04L 5/0055* (2013.01); *H04L 61/2038* (2013.01); *H04L 61/6068* (2013.01); *H04L 67/12* (2013.01); *H04L 69/28* (2013.01); *G05B 2219/39549* (2013.01)

(58) Field of Classification Search
None
See application file for complete search history.

(56) References Cited

U.S. PATENT DOCUMENTS

| | | | |
|---|---|---|---|
| 8,253,378 B2 | 8/2012 | Lee et al. | |
| 2009/0006010 A1* | 1/2009 | Van Sloun | G01R 31/3662 702/57 |

FOREIGN PATENT DOCUMENTS

| | | |
|---|---|---|
| CN | 101849340 A | 9/2010 |
| EP | 2201660 A2 | 6/2010 |
| JP | 5330397 A | 1/2011 |
| KR | 101107999 B1 | 4/2009 |
| WO | WO2009051415 A2 | 4/2009 |

* cited by examiner

Primary Examiner — Wissam Rashid
(74) Attorney, Agent, or Firm — Bacon & Thomas, PLLC

(57) ABSTRACT

A battery management system having capability for addressing and time-division communication, the battery management system comprises a controller and a plurality of sensors, the sensors can communicatively connect to the controller; wherein each sensor has a communication port, the controller can transmit a plurality of addressing commands to address each of the sensors, each of the sensors can control the communication period of each communication port in accordance with its received addressing command, therefore the sensors and the controller can execute the time-division communication.

18 Claims, 16 Drawing Sheets

BATTERY MANAGEMENT SYSTEM HAVING CAPABILITY FOR ADDRESSING AND TIME-DIVISION COMMUNICATION

BACKGROUND OF THE INVENTION

1. Field of the Invention

The invention relates to a battery management system, and more particularly to a battery management system having capability for addressing, and the battery management system has capability for time-division communication, the battery management system has a plurality of sensors, the sensors can communicatively connect to a controller, the addressing capability can be a manual addressing of button or an automatic addressing of string voltage, the time-division communication can be a group type.

2. Description of Related Art

A prior-art is disclosed in U.S. Pat. No. 8,253,378 (its patent family has China Patent No. CN101849340, European Patent No. EP2201660, Japan Patent No. JP5330397, Korea Patent No. KR101107999 and PCT Patent No. WO2009051415), the prior-art disclosed a switch module (120) electrically connected to a microprocessor (150) and a battery module (110), the microprocessor (150) can control the switch module (120) to use a voltage sensor (130) to measure the voltage value of each battery by a time-division manner, as shown in FIG. 2 of the prior-art. Moreover, a module (1) can be formed by the switch module (120), the battery module (110) and the voltage sensor (130), the microprocessor (150) can electrically connect a plurality of modules (1-k), as shown in FIG. 4 of the prior-art. the microprocessor (150) limits the number of the voltage sensor (130), the amount of the battery is also limited by the microprocessor (150). Thus, the expandability of the prior-art still needs to improvement.

SUMMARY OF THE INVENTION

It is therefore a first object of the invention to provide a battery management system having capability for addressing and time-division communication, the battery management system comprises a controller and a plurality of sensors, each sensor has a button and a communication port, the sensors can communicatively connect to the controller; wherein the controller can transmit a plurality of addressing commands, each of the sensors can be addressed by sequentially pressing the buttons, each of the sensors can control the communication period of each communication port in accordance with its received addressing command, therefore the sensors and the controller can execute the time-division communication.

It is therefore a second object of the invention to provide a battery management system having capability for addressing and time-division communication, the battery management system comprises a controller and a plurality of sensors, each sensor has a string voltage measuring circuit and a communication port, the sensors can communicatively connect to the controller; wherein the controller can transmit a plurality of addressing commands, each of the sensors can be addressed by comparing the string voltage of each sensor with the voltage value of each addressing command, each of the sensors can control the communication period of each communication port in accordance with its received addressing command, therefore the sensors and the controller can execute the time-division communication.

First advantages of the invention is, an addressing manner of the battery management system uses pressing the button of each sensor to receive the addressing command, therefore user can randomly arrange the address of the sensors, and the setting time can be reduced.

Second advantages of the invention is, a communication manner of the battery management system is a time-division communication, the sensors will not simultaneously communicate with the controller, therefore reduce the energy consumption.

Third advantages of the invention is, the sensors of the battery management system can achieve a time-division communication of group type, the required energy of each group communication will not exceed the maximum working energy of the controller, therefore the amount of the sensors will be not limited to the maximum working energy of the controller, the battery management system can be provided with the better expandability.

Fourth advantages of the invention is, another addressing manner of the battery management system uses comparing the string voltage of each sensor with the voltage value of each addressing command to automatic address each of the sensors, therefore user dose not need to manual set the address of each sensor, and the setting time can be reduced.

The above and other objects, features and advantages of the invention will become apparent from the following detailed description taken with the accompanying drawings.

DETAILED DESCRIPTION OF THE INVENTION

Figure 1:
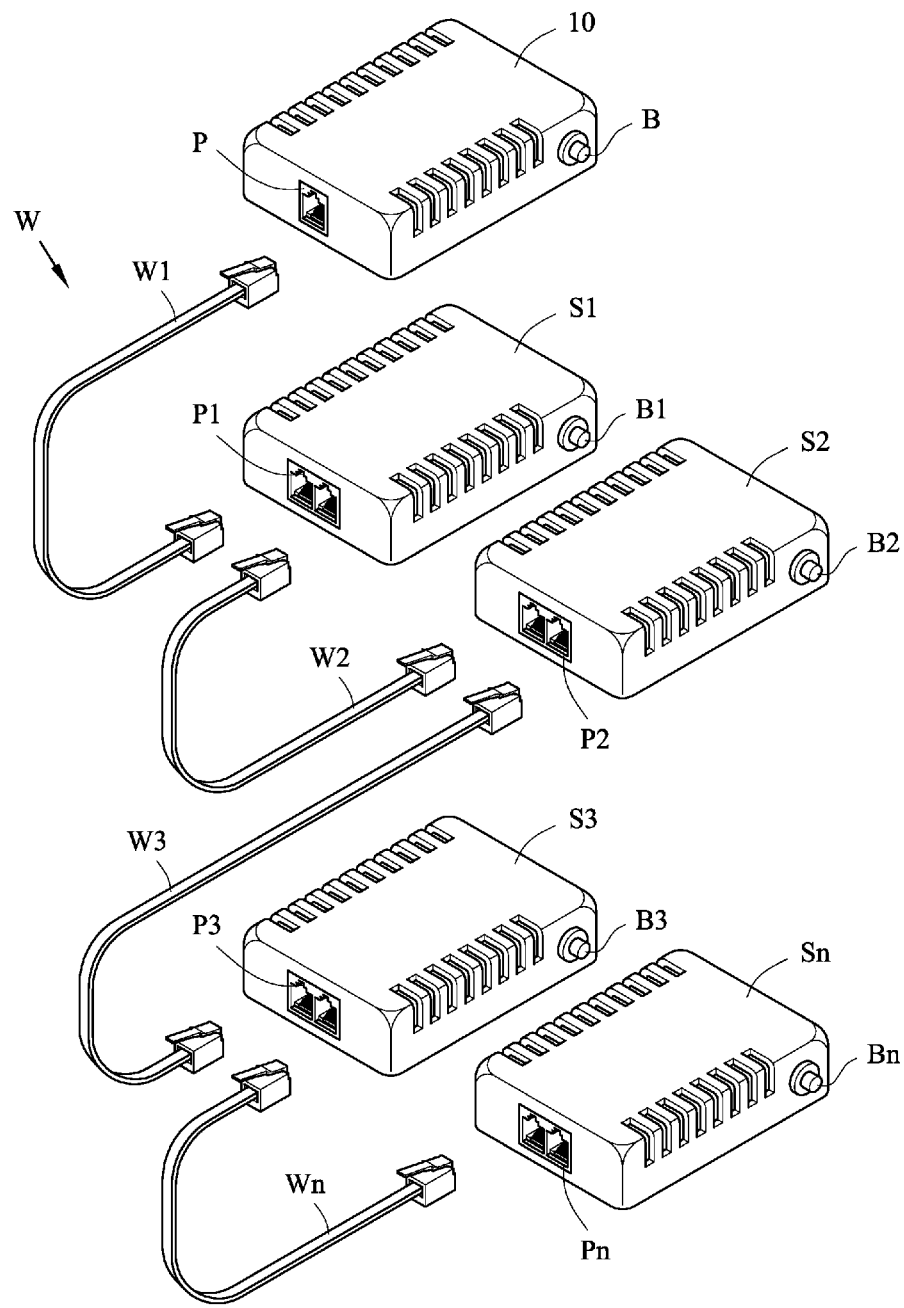
FIG. 1 is an exploded view showing a first embodiment of the invention.
Figure 2:
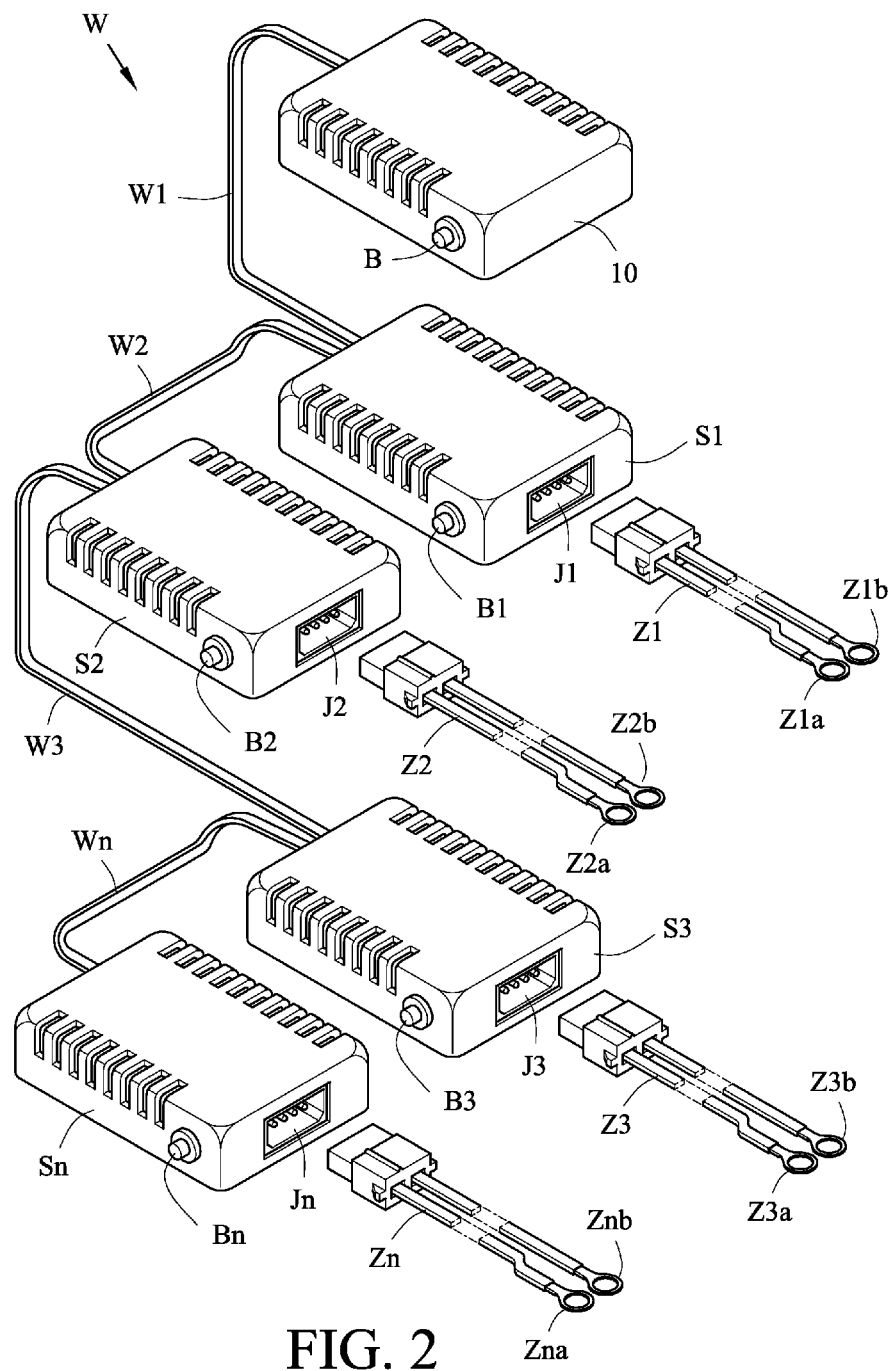
FIG. 2 is another exploded view showing the first embodiment of the invention.
Figure 3:
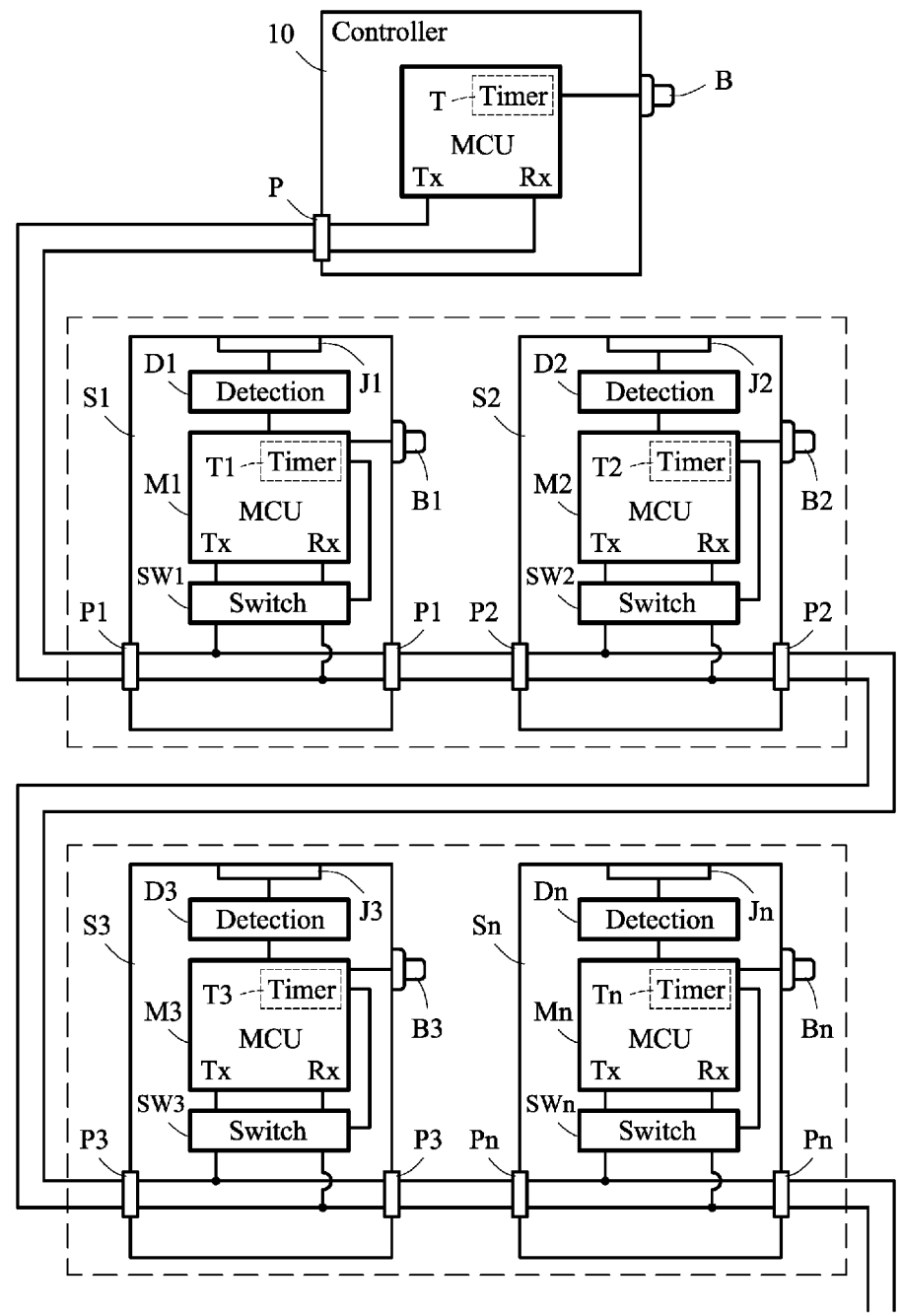
FIG. 3 is a functional block diagram illustrating the first embodiment of the invention.

Referring to FIGS. 1 to 3, a battery management system in accordance with a first embodiment of the invention comprises a controller 10, a plurality of sensors S1-Sn and a communication cable assembly W; the controller 10 has a time-division counter T and a communication port P, the time-division counter T is used to provide for time counting of the controller 10; the sensor S1 has a processor M1, a battery detection circuit D1, a communication port P1 and a button B1; the sensor S2 has a processor M2, a battery detection circuit D2, a communication port P2 and a button B2. According to the above inference, the sensor Sn has a processor Mn, a battery detection circuit Dn, a communication port Pn and a button Bn. The communication cable assembly W can string connect with the communication ports P-Pn, therefore communicatively connect the controller 10 and the plural sensors S1-Sn. When the controller 10 transmits an addressing command C1, an operator can press the button B1, the processor M1 will open the communication port P1 to receive the addressing command C1, and then address the sensor S1; the processor M1 can control a communication period of the communication port P1 in accordance with the addressing command C1. When the controller 10 transmits an addressing command C2, the operator can press the button B2, the processor M2 will open the communication port P2 to receive the addressing command C2, and then address the sensor S2; the processor M2 can control a communication period of the communication port P2 in accordance with the addressing command C2. According to the above inference, when the controller 10 transmits an addressing command Cn, the operator can press the button Bn, the processor Mn will open the communication port Pn to receive the addressing command Cn, and then address the sensor Sn; the processor Mn can control a communication period of the communication port Pn in accordance with the addressing command Cn. Thus, the sensor S1 and the controller 10 can execute the time-division communication in accordance with the communication period of the communication port P1, the sensor S2 and the controller 10 can execute the time-division communication in accordance with the communication period of the communication port P2. According to the above inference, the sensor Sn and the controller 10 can execute the time-division communication in accordance with the communication period of the communication port Pn.

Examples of a control manner of the communication ports P1-Pn, the processor M1 can use a switch SW1 or a signal line to control the open and close of the communication port P1, and therefore can control the communication period of the communication port P1; the processor M2 can use a switch SW2 or a signal line to control the open and close of the communication port P2, and therefore can control the communication period of the communication port P2. According to the above inference, the processor Mn can use a switch SWn or a signal line to control the open and close of the communication port Pn, and therefore can control the communication period of the communication port Pn.

Examples of the contents of the addressing commands C1-Cn, the content of each addressing command has a sensor group data, a sensor location data and a communication period data; the addressing command C1 can set the group of the sensor S1, the location of the sensor S1 and the communication period of the communication port P1; the addressing command C2 can set the group of the sensor S2, the location of the sensor S2 and the communication period of the communication port P2. According to the above inference, the addressing command Cn can set the group of the sensor Sn, the location of the sensor Sn and the communication period of the communication port Pn.

Figure 4:
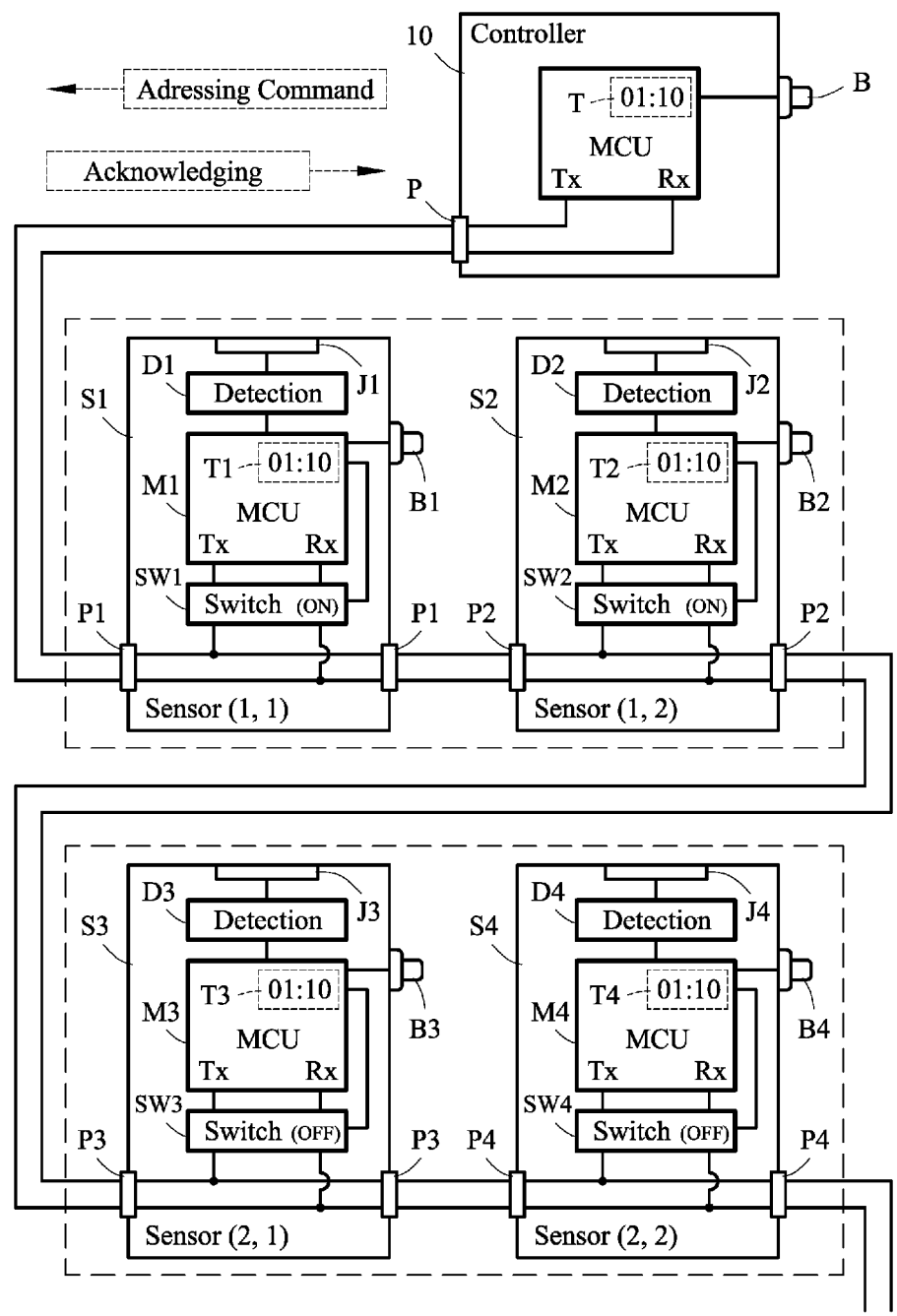
FIG. 4 is a time-division communication diagram illustrating a first group sensors of the first embodiment of the invention.
Figure 5:
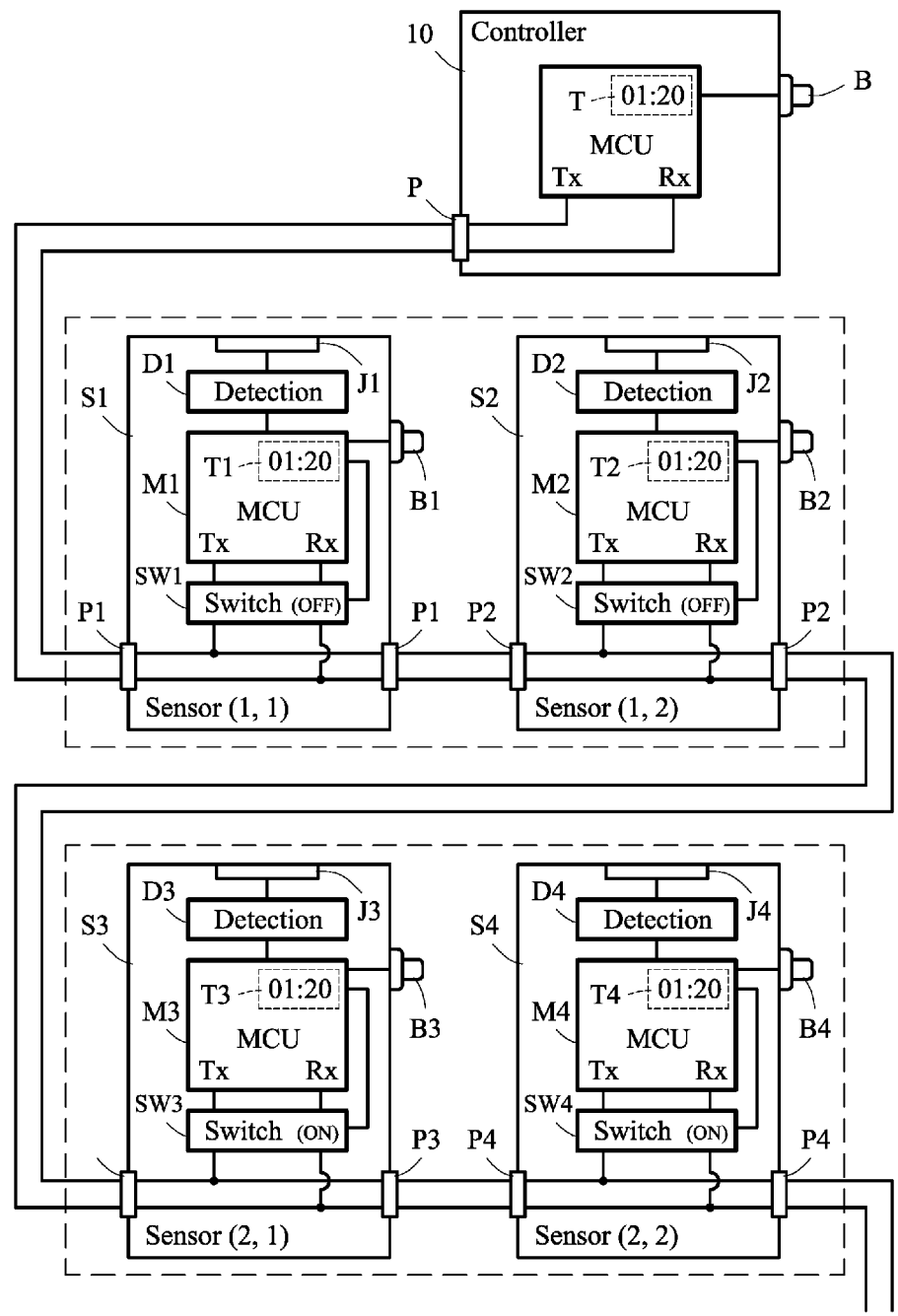
FIG. 5 is a time-division communication diagram illustrating a second group sensors of the first embodiment of the invention.
Figure 6:
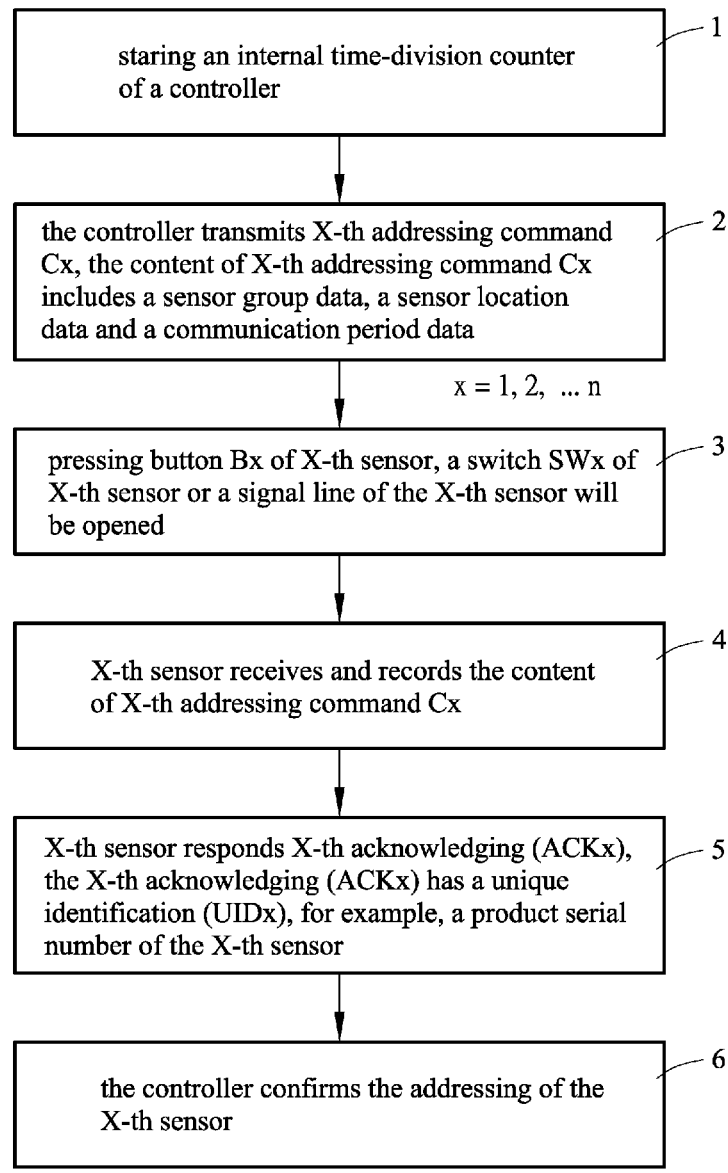
FIG. 6 and FIG. 7 are an addressing flowchart illustrating the plural sensors of the first embodiment of the invention.
Figure 7:
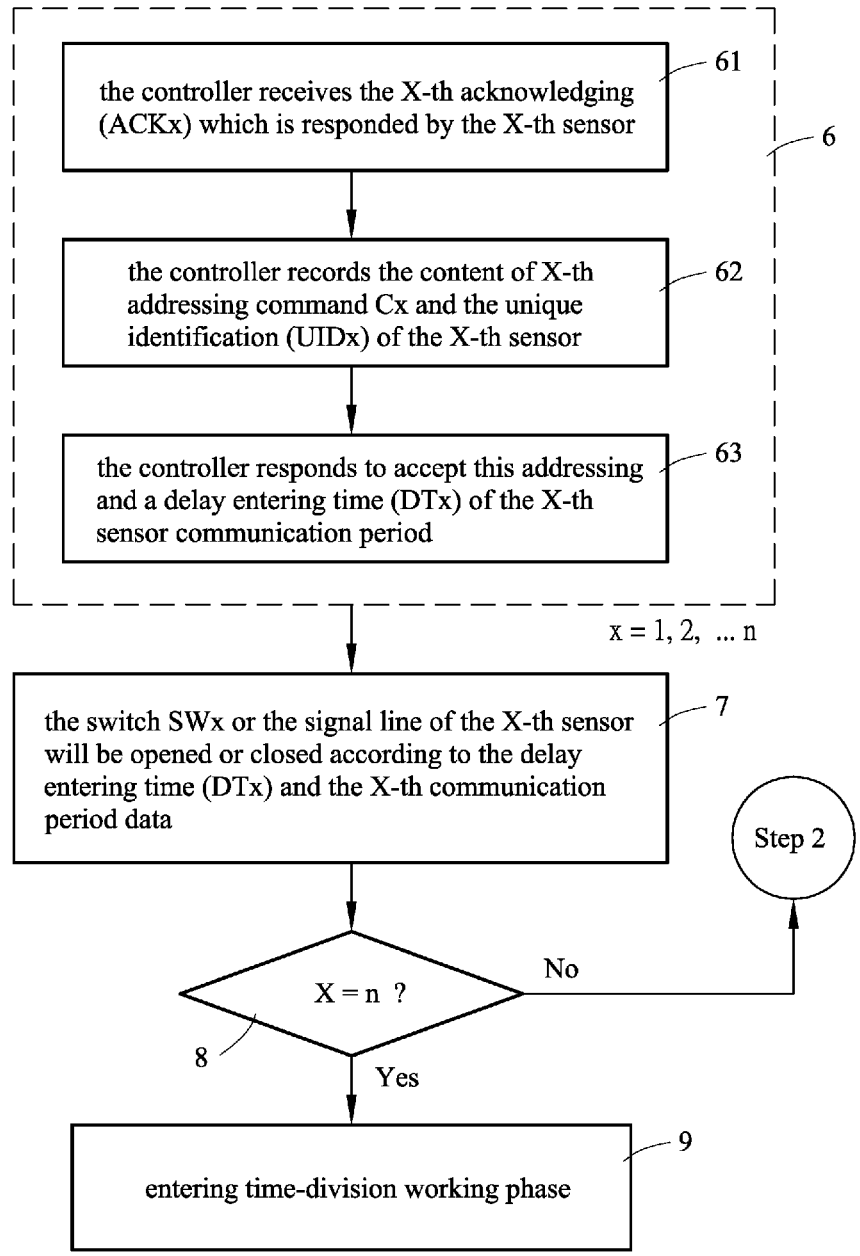

Referring to FIGS. 4 to 5, examples of the time-division working phase of the invention which is addressed, for example but not limited to four sensors S1-S4: the group of the sensor and the location of the sensor can be indicated by a function Sensor (group, location), the sensor S1 can be addressed as Sensor (1, 1), and then the sensor S2 can be addressed as Sensor (1, 2); the sensor S3 can be addressed as Sensor (2, 1), and then the sensor S4 can be addressed as Sensor (2, 2); the sensor S1 and the sensor S2 are belong to a first group, the sensor S3 and the sensor S4 are belong to a second group. When the time value of the time-division counter T is assumed to be 01:10, the processor M1 can use the switch SW1 to open the communication port P1, the processor M2 can use the switch SW2 to open the communication port P2, the processor M3 can use the switch SW3 to close the communication port P3, and the processor M4 can use the switch SW4 to close the communication port P4, therefore the sensors S1-S2 of the first group and the controller 10 can execute the time-division communication. When the time value of the time-division counter T is assumed to be 01:20, the processor M1 can use the switch SW1 to close the communication port P1, the processor M2 can use the switch SW2 to close the communication port P2, the processor M3 can use the switch SW3 to open the communication port P3, and the processor M4 can use the switch SW4 to open the communication port P4, therefore the sensors S3-S4 of the second group and the controller 10 can execute the time-division communication.

Referring to FIGS. 4 to 7, examples of an addressing process of the sensors S1-S2, for example but not limited to the following steps: step 1, staring an internal time-division counter T of a controller 10; step 2, the controller 10 transmits the X-th addressing command Cx, wherein X is from 1 to n, n is the total number of sensors which can be string connected to the controller 10, the content of the X-th addressing command Cx includes a sensor group data, a sensor location data and a communication period data; step 3, pressing the button Bx of the X-th sensor, a switch SWx of the X-th sensor or a signal line of the X-th sensor will be opened; step 4, the X-th sensor receives and records the content of the X-th addressing command Cx; step 5, the X-th sensor responds the X-th acknowledging (ACKx), the X-th acknowledging (ACKx) has a unique identification (UIDx), for example, the unique identification (UIDx) can be a product serial number of the X-th sensor; step 6, the controller 10 confirms the addressing of the X-th sensor; wherein the step 6 further comprises steps 61-63; in the step 61, the controller 10 receives the X-th acknowledging (ACKx) which is responded by the X-th sensor; in the step 62, the controller 10 records the content of the X-th addressing command Cx and the unique identification (UIDx) of the X-th sensor; in the step 63, the controller 10 responds to accept this addressing and a delay entering time (DTx) of the X-th sensor communication period, the delay entering time (DTx) can reduce the synchronization error between the controller 10 and the X-th sensor; step 7, the switch SWx or the signal line of the X-th sensor will be opened or closed according to the delay entering time (DTx) and the X-th communication period data; step 8, the controller 10 can determine whether X is equal to n or not, if the determination is "NOT", then return to the step 2, and continuously execute the addressing of next sensor; if the determination is "YES", then execute step 9, entering the time-division working phase.

Examples of the acknowledging (ACKx) response manner of the plural sensors S1-Sn, the processor M1 can respond an acknowledging (ACK1) after the addressing command C1 is received and saved, the controller 10 can receive and save the acknowledging (ACK1) to confirm the addressing of the sensor S1; the processor M2 can respond an acknowledging (ACK2) after the addressing command C2 is received and saved, the controller 10 can receive and save the acknowledging (ACK2) to confirm the addressing of the sensor S2. According to the above inference, the processor Mn can respond an acknowledging (ACKn) after the addressing command Cn is received and saved, the controller 10 can receive and save the acknowledging (ACKn) to confirm the addressing of the sensor Sn.

Examples of the content of the acknowledging (ACKx), the acknowledging (ACK1) has a unique identification (UID1), the unique identification (UID1) can be a product serial number of the sensor S1; the acknowledging (ACK2) has a unique identification (UID2), the unique identification (UID2) can be a product serial number of the sensor S2. According to the above inference, the acknowledging (ACKn) has a unique identification (UIDn), the unique identification (UIDn) can be a product serial number of the sensor Sn.

Examples of the synchronization manner between the controller 10 and the plural sensors S1-Sn, the sensor S1 has a timer T1, the controller 10 can respond a delay entering time (DT1) of the sensor S1 communication period; the sensor S2 has a timer T2, the controller 10 can respond a delay entering time (DT2) of the sensor S2 communication period. According to the above inference, the sensor Sn has a timer Tn, the controller 10 can respond a delay entering time (DTn) of the sensor Sn communication period. Thus, the controller 10 can reduce the synchronization error between the time-division counter T and each of the timers T1-Tn.

Examples of a first setting manner of the sensor amount (n), the controller 10 has a button B, the operator can sequentially press the button B, the controller 10 can sequentially transmit a plurality of addressing commands C1-Cn, and therefore the pressing frequency of the button B can decide the total number of sensor which can be string connected to the controller 10.

Examples of a second setting manner of the sensor amount (n), the controller 10 has a default total number (X) of sensor, the controller 10 can sequentially transmit a plurality of addressing commands C1-Cn according to the addressing status of the plural sensors S1-Sn, wherein X is from 1 to n, therefore can decide the total number of plural sensors S1-Sn which can be string connected to the controller 10.

Figure 8:
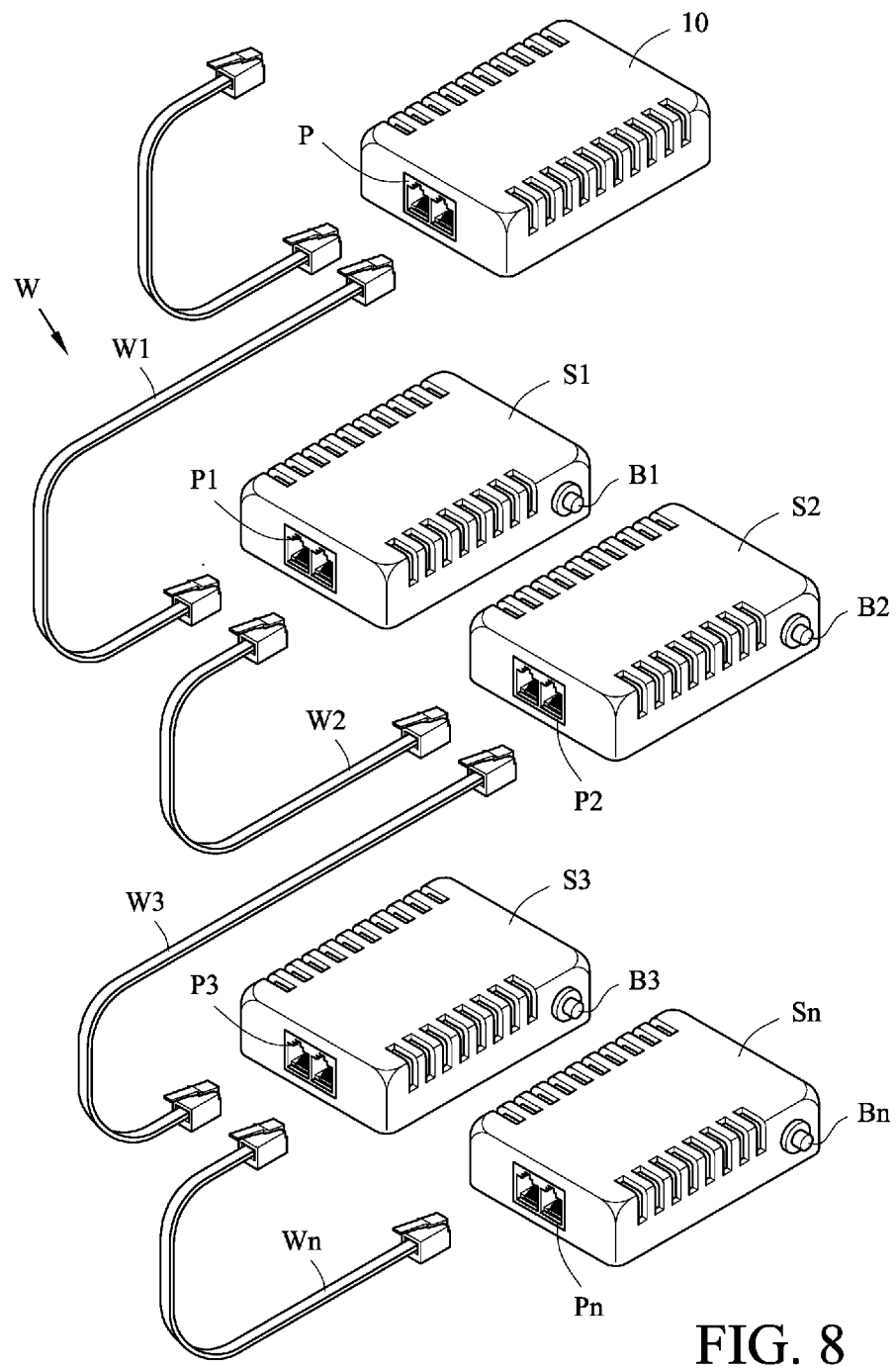
FIG. 8 is an exploded view showing a second embodiment of the invention.
Figure 9:
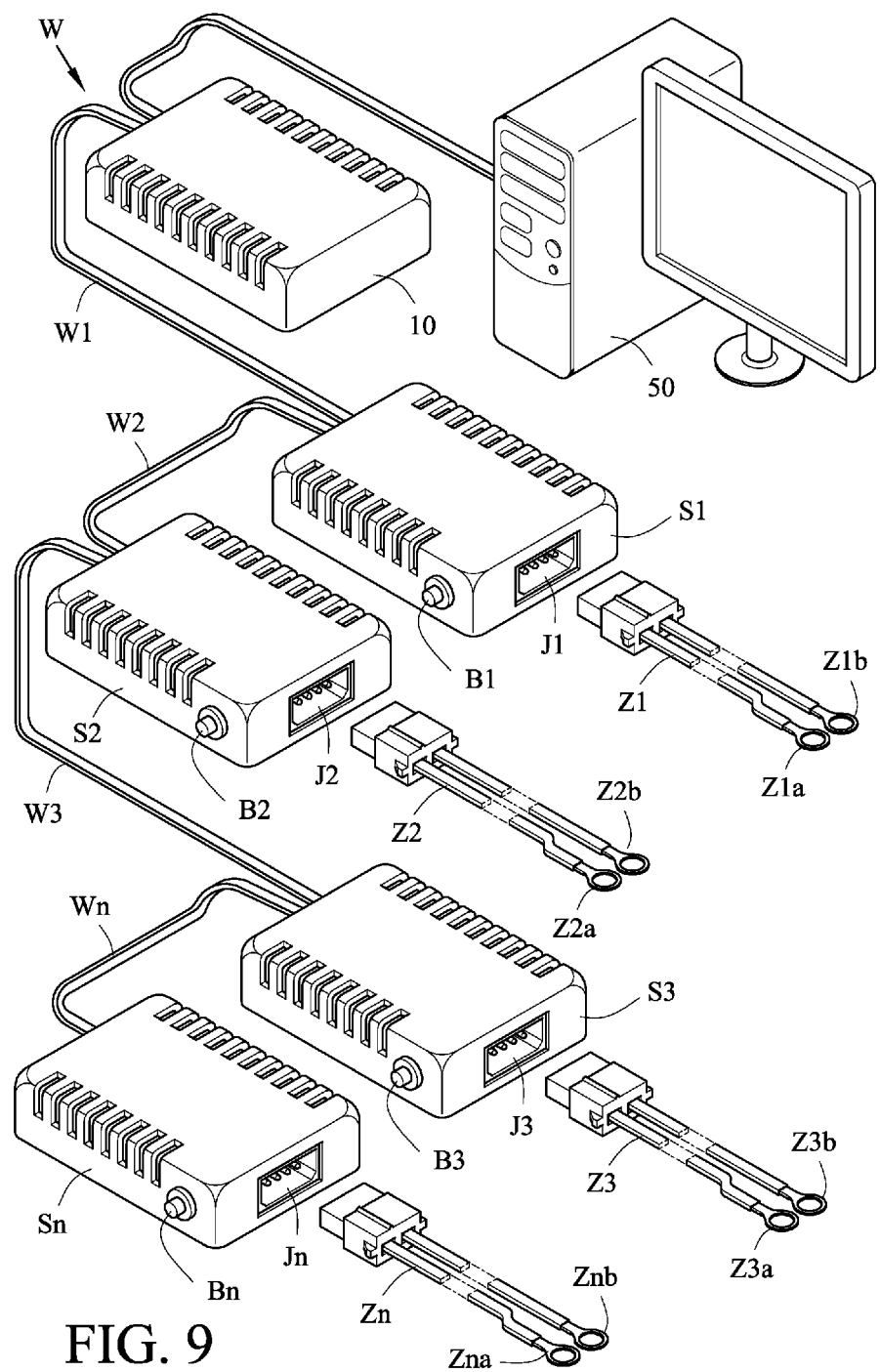
FIG. 9 is another exploded view showing the second embodiment of the invention.
Figure 10:
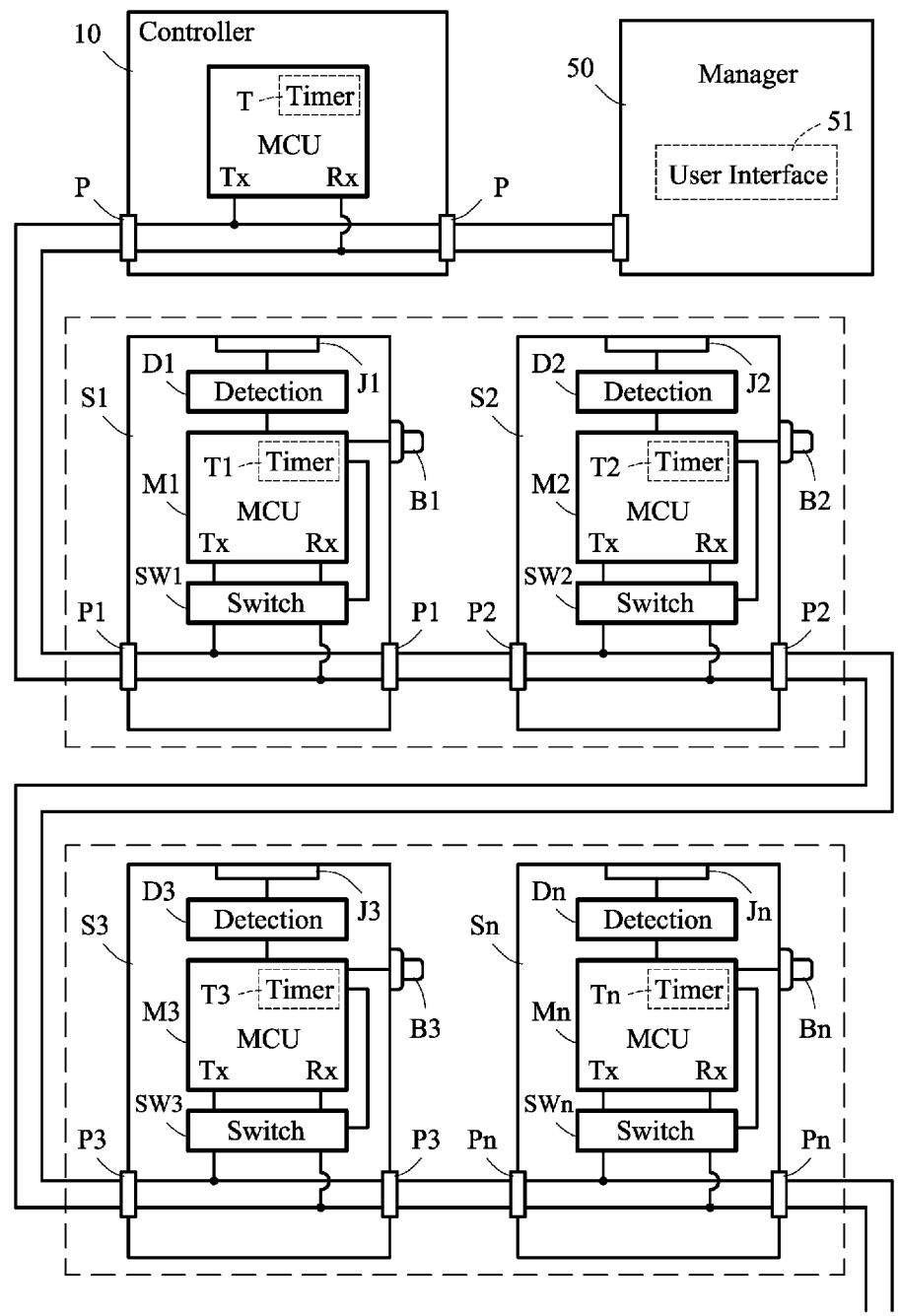
FIG. 10 is a functional block diagram illustrating the second embodiment of the invention.

Referring to FIGS. 8 to 10, a second embodiment of the invention is almost same to the first embodiment of the invention, the difference between them is, the communication port P of the controller 10 can further communicatively connect a manager 50, wherein the manager 50 can be provided with a user interface 51, the user interface 51 can set a total number (X) of sensor, the total number (X) of sensor is transmitted from the manager 50 to the controller 10, the controller 10 can sequentially transmit a plurality of addressing commands C1-Cn according to the addressing status of the plural sensors S1-Sn, wherein X is from 1 to n, therefore can decide the total number of plural sensors S1-Sn which can be string connected to the controller 10.

Referring to FIGS. 1 to 3 and FIGS. 8 to 10, the communication cable assembly W has a plurality of communication cables W1-Wn, the communication cable W1 can string connect the communication port P and the communication port P1, other communication ports P2-Pn can be string connected by other communication cables W2-Wn, therefore the communication cable W1 can communicatively connect the controller 10 and the plural sensors S1-Sn; the battery detection circuit D1 can electrically connect a connecting port J1, the connecting port J1 can connect a battery detection cable Z1, the battery detection cable Z1 has a pair of battery detection terminals Z1a-Z1b; the battery detection circuit D2 can electrically connect a connecting port J2, the connecting port J2 can connect a battery detection cable Z2, the battery detection cable Z2 has a pair of battery detection terminals Z2a-Z2b. According to the above inference, the battery detection circuit Dn can electrically connect a connecting port Jn, the connecting port Jn can connect a battery detection cable Zn, the battery detection cable Zn has a pair of battery detection terminals Zna-Znb.

Examples of a deletion manner of the connecting ports J1-Jn, the battery detection circuit D1 can electrically connect a battery detection cable Z1, the battery detection cable Z1 has a pair of battery detection terminals Z1a-Z1b; the battery detection circuit D2 can electrically connect a battery detection cable Z2, the battery detection cable Z2 has a pair of battery detection terminals Z2a-Z2b. According to the above inference, the battery detection circuit Dn can electrically connect a battery detection cable Zn, the battery detection cable Zn has a pair of battery detection terminals Zna-Znb.

Figure 11:
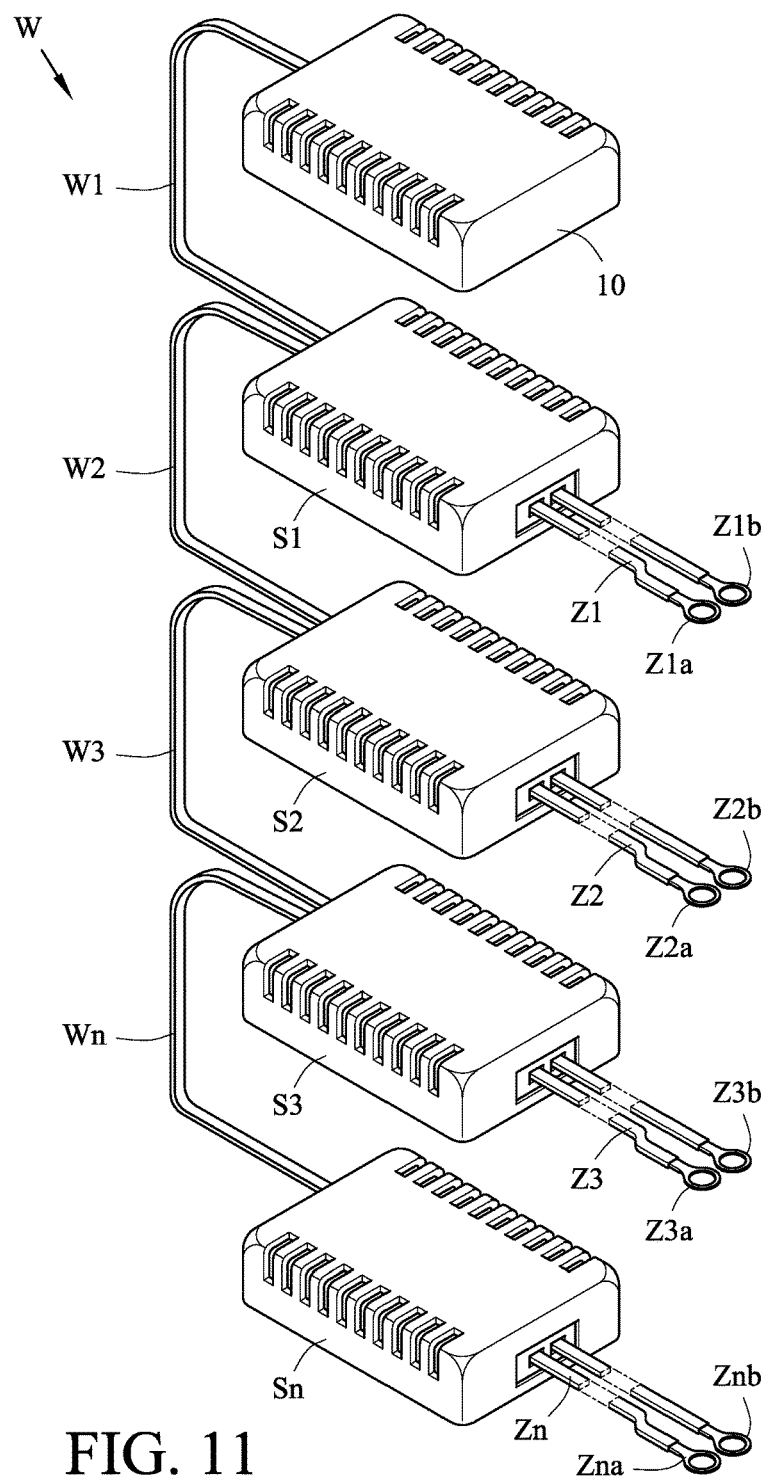
FIG. 11 is an exploded view showing a third embodiment of the invention.
Figure 12:
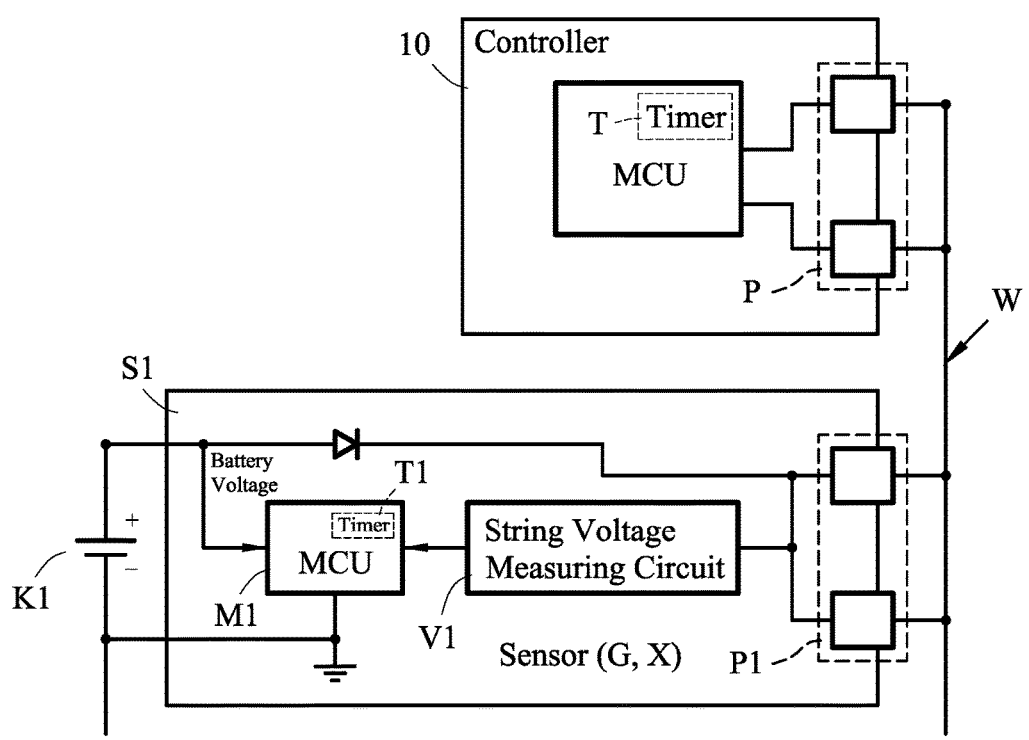
FIG. 12 and FIG. 13 are a functional block diagram illustrating the third embodiment of the invention.
Figure 13:
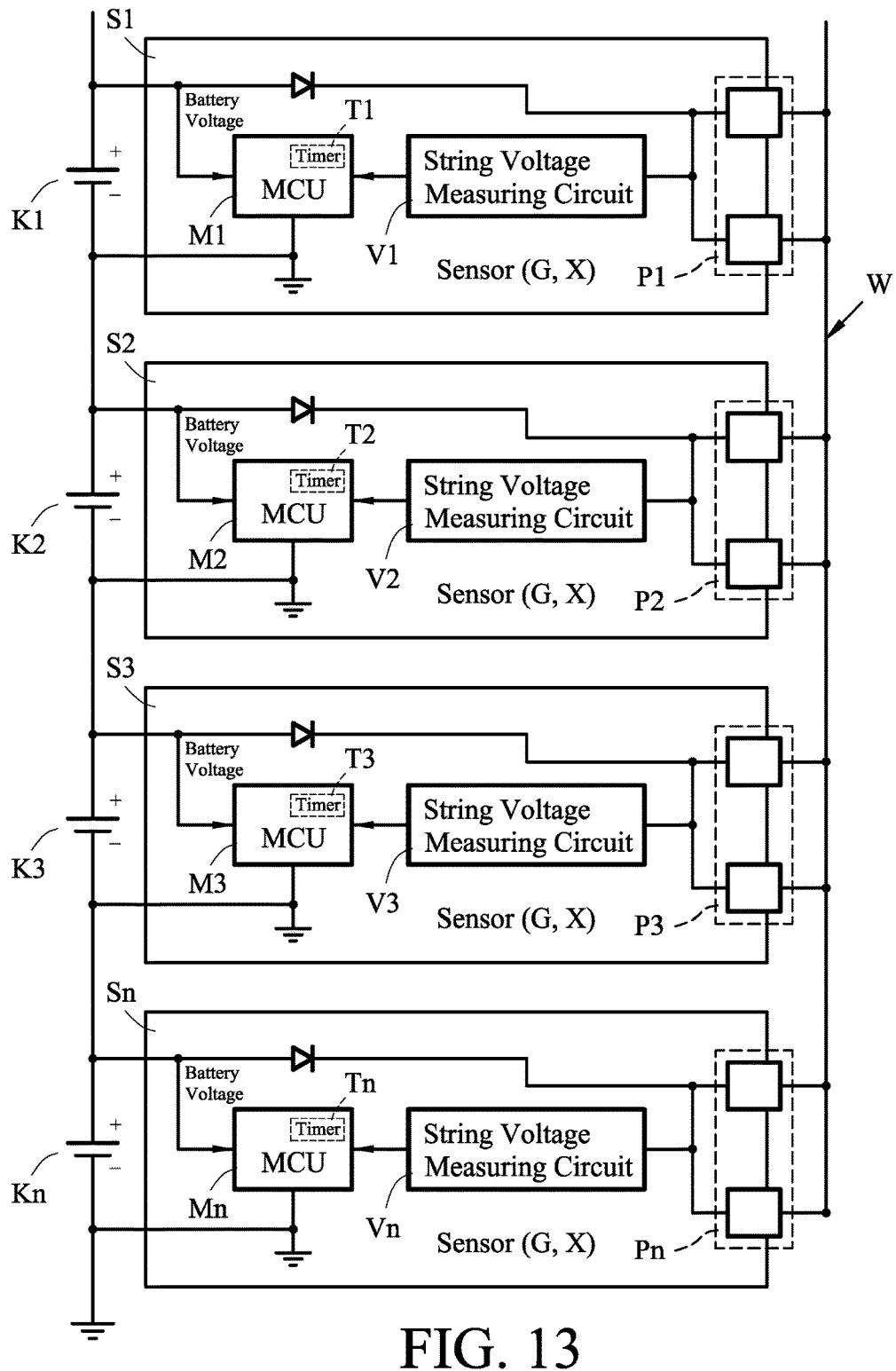

Referring to FIGS. 11 to 13, in a third embodiment of the invention, the battery management system comprises a controller 10, a plurality of sensors S1-Sn and a communication cable assembly W; the controller 10 has a time-division counter T and a communication port P, the time-division counter T is used to provide for time counting of the controller 10; the plural sensors S1-Sn individually detect the voltage of plural battery K1-Kn; the sensor S1 has a processor M1, a string voltage measuring circuit V1 and a communication port P1; the sensor S2 has a processor M2, a string voltage measuring circuit V2 and a communication port P2. According to the above inference, the sensor Sn has a processor Mn, a string voltage measuring circuit Vn and a communication port Pn. Moreover, the communication cable assembly W is used to string connect the communication ports P-Pn, therefore can communicatively connect the controller 10 and the plural sensors S1-Sn; the controller 10 can transmit a plurality of addressing commands C1-Cn; wherein the processor M1 can open the communication port P1 to receive the addressing command C1, if the string voltage measured by the string voltage measuring circuit V1 is smaller than the voltage value of the addressing command C1, the processor M1 will accept addressing, and the processor M1 will control the communication period of the communication port P1 in accordance with the addressing command C1. Moreover, the processor M2 can open the communication port P2 to receive the addressing command C2, if the string voltage measured by the string voltage measuring circuit V2 is smaller than the voltage value of the addressing command C2, the processor M2 will accept addressing, and the processor M2 will control the communication period of the communication port P2 in accordance with the addressing command C2. According to the above inference, the processor Mn can open the communication port Pn to receive the addressing command Cn, if the string voltage measured by the string voltage measuring circuit Vn is smaller than the voltage value of the addressing command Cn, the processor Mn will accept addressing, and the processor Mn will control the communication period of the communication port Pn in accordance with the addressing command Cn. Thus, the sensor S1 and the controller 10 can execute the time-division communication in accordance with the communication period of the communication port P1, the sensor S2 and the controller 10 can execute the time-division communication in accordance with the communication period of the communication port P2. According to the above inference, the sensor Sn and the controller 10 can execute the time-division communication in accordance with the communication period of the communication port Pn.

Examples of a control manner of the communication ports Pl-Pn, the processor M1 can control the open and close of the communication port P1, and therefore can control the communication period of the communication port P1; the processor M2 can control the open and close of the communication port P2, and therefore can control the communication period of the communication port P2. According to the above inference, the processor Mn can control the open and close of the communication port Pn, and therefore can control the communication period of the communication port Pn.

Examples of the contents of the addressing commands C1-Cn, the content of each addressing command has a sensor group data, a sensor location data and a communication period data; the addressing commands C1 can set the group of the sensor S1, the location of the sensor S1 and the communication period of the communication port P1; the addressing commands C2 can set the group of the sensor S2, the location of the sensor S2 and the communication period of the communication port P2. According to the above inference, the addressing commands Cn can set the group of the sensor Sn, the location of the sensor Sn and the communication period of the communication port Pn.

Figure 14:
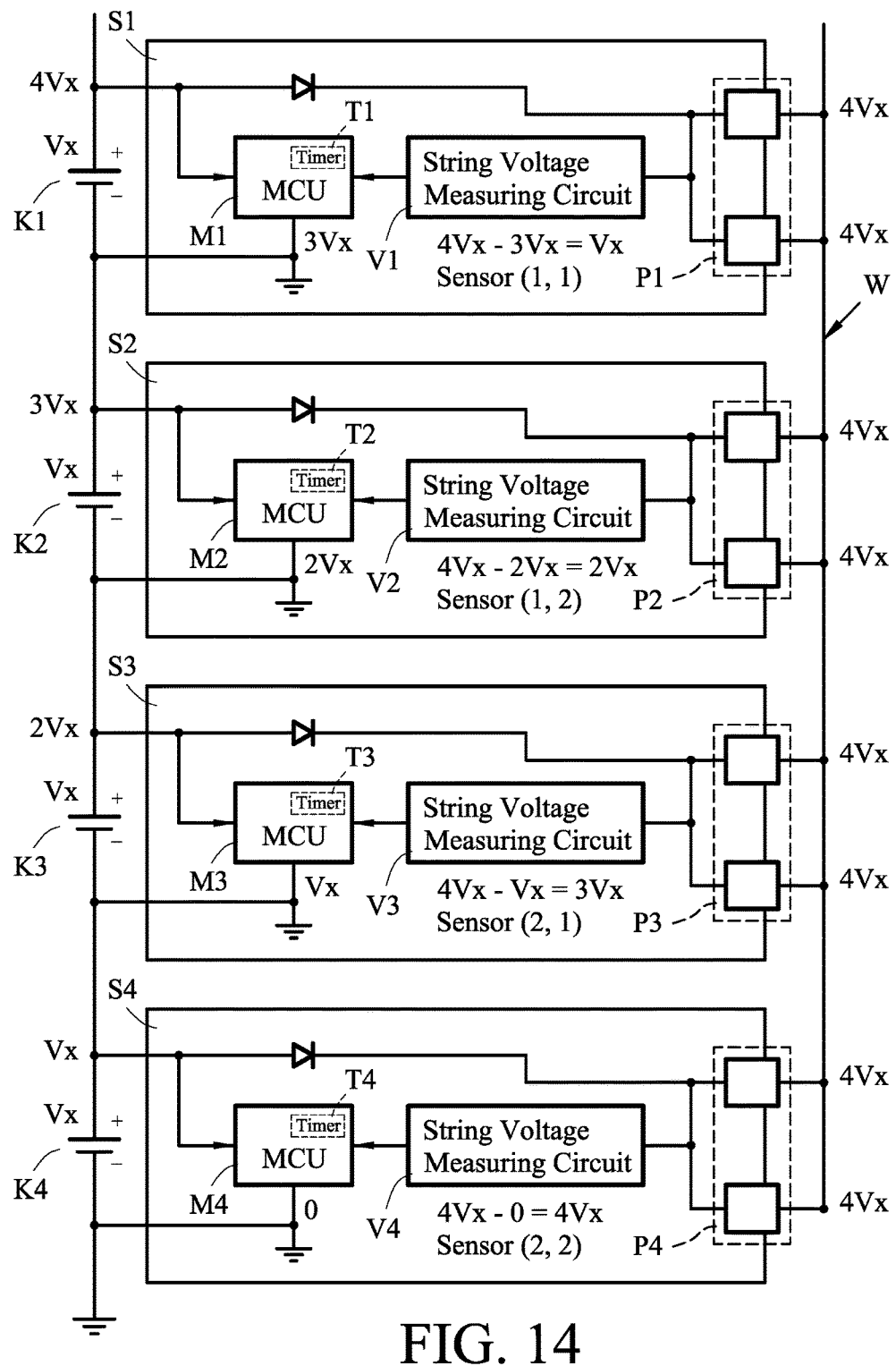
FIG. 14 is a string voltage measuring diagram illustrating the third embodiment of the invention.
Figure 15:
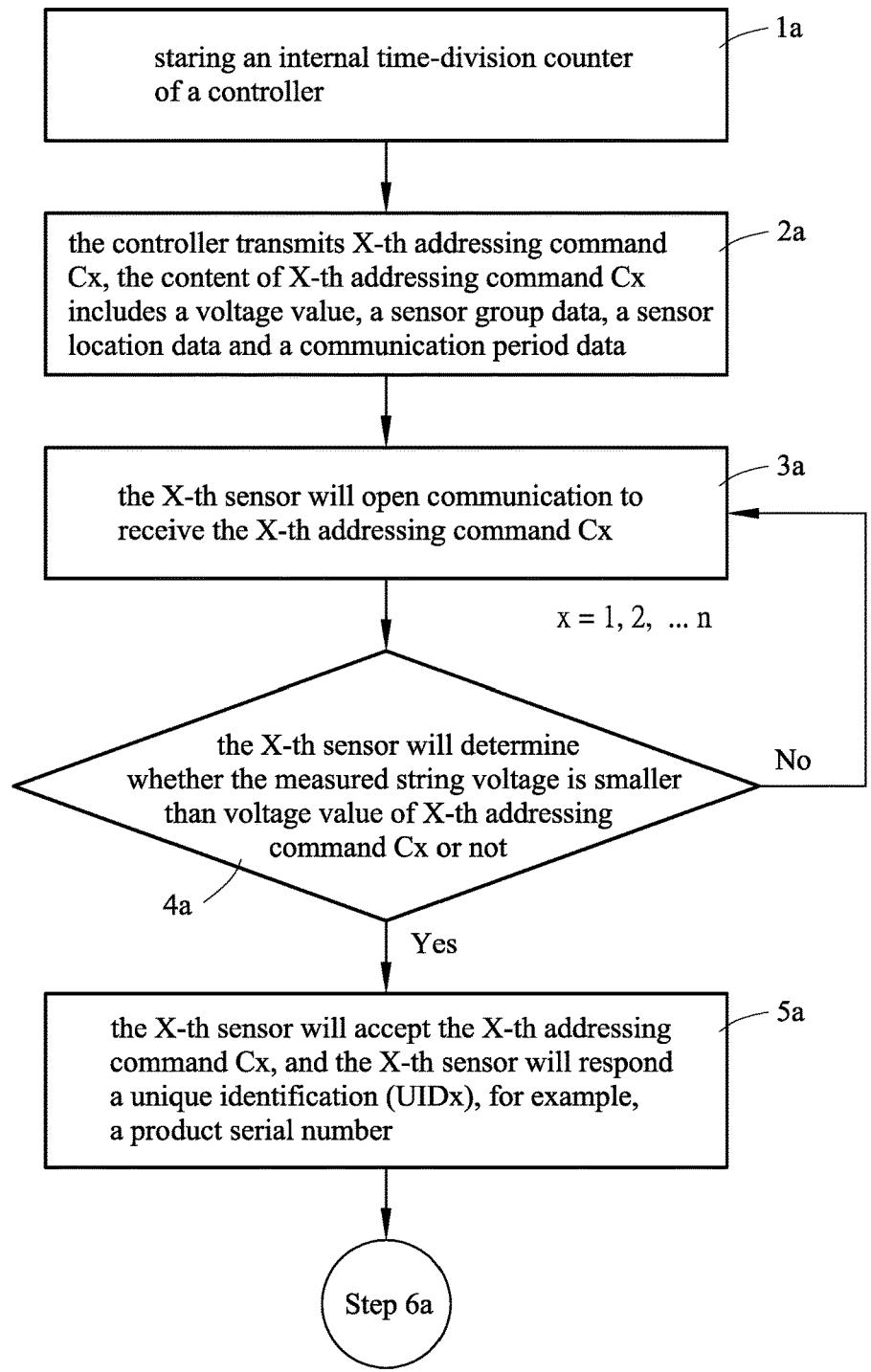
FIG. 15 and FIG. 16 are an addressing flowchart illustrating the plural sensors of the third embodiment of the invention.
Figure 16:
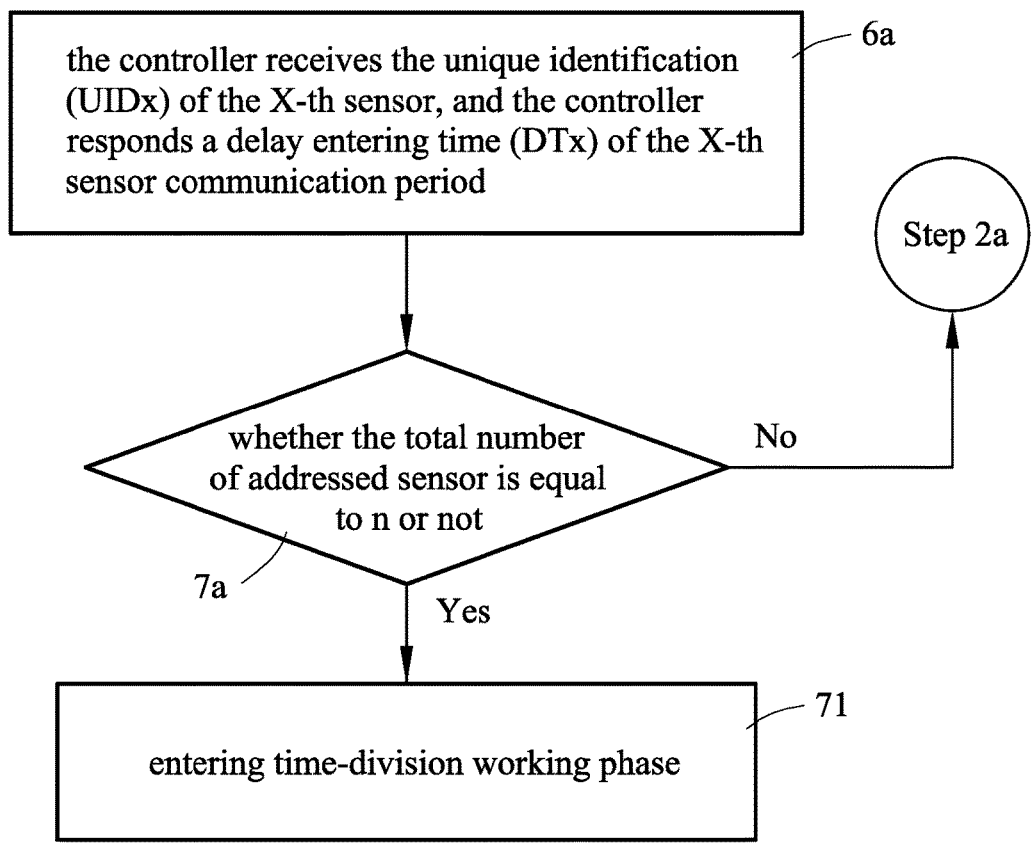

Referring to FIG. 14, examples of a string voltage measuring manner of the string voltage measuring circuits V1-Vn, for example but not limited to: if four sensors S1-S4 are string connected, and each battery voltage of the sensors S1-S4 is Vx, then series connection voltage of four batteries K1-K4 will be 4Vx, and reference voltage of communication ports P1-P4 will be 4Vx; wherein the string voltage measuring circuits V1 is determined as follows: 4Vx−3Vx=Vx, 4Vx is reference voltage of the communication port P1, 3Vx is reference voltage of the processor M1 (e.g., series connection voltage of three batteries K2-K4); the string voltage measuring circuits V2 is determined as follows: 4Vx−2Vx=2Vx, 4Vx is reference voltage of the communication port P2, 2Vx is reference voltage of the processor M2 (e.g., series connection voltage of two batteries K3-K4); the string voltage measuring circuits V3 is determined as follows: 4Vx−Vx=3Vx, 4Vx is reference voltage of the communication port P3, Vx is reference voltage of the processor M3 (e.g., series connection voltage of battery K4); the string voltage measuring circuits V4 is determined as follows: 4Vx (reference voltage of the communication port P4)−0 (reference voltage of the processor M3, e.g., grounding)=4Vx. Examples of an addressing manner of the third embodiment, for example but not limited to: the group of the sensor and the location of the sensor can be indicated by a function Sensor (group, location), the sensor S1 can be addressed as Sensor (1, 1), the sensor S2 can be addressed as Sensor (1, 2), the sensor S3 can be addressed as Sensor (2, 1), and the sensor S4 can be addressed as Sensor (2, 2); wherein the addressed sensors S1-S2 can enter the time-division working phase.

Referring to FIGS. 11 to 13 and FIGS. 15 to 16, examples of an addressing process of the sensors S1-S2, for example but not limited to the following steps: step la, staring an internal time-division counter T of a controller 10; step 2*a,* the controller 10 transmits the X-th addressing command Cx, wherein X is from 1 to n, n is the total number of sensors which can be string connected to the controller 10, the content of the X-th addressing command Cx includes a voltage value, a sensor group data, a sensor location data and a communication period data; step 3*a,* the X-th sensor will open communication to receive the X-th addressing command Cx; step 4*a,* the X-th sensor will determine whether the measured string voltage is smaller than the voltage value of the X-th addressing command Cx or not, if the determination is "NOT", then return to the step 3*a,* and execute the addressing of other sensor; if the determination is "YES", then execute step 5*a,* the X-th sensor will accept the X-th addressing command Cx, and the X-th sensor will respond a unique identification (UIDx), for example, the unique identification (UIDx) can be a product serial number of the X-th sensor; step 6*a,* the controller 10 receives the unique identification (UIDx) of the X-th sensor, and the controller 10 responds a delay entering time (DTx) of the X-th sensor communication period; step 7*a,* the controller 10 can determine whether the total number of addressed sensor is equal to n or not, if the determination is "NOT", then return to the step 2*a,* and continuously execute the addressing of other sensor; if the determination is "YES", then execute step 71, entering the time-division working phase.

Examples of the contents of the addressing commands C1-Cn, the content of each addressing command has a sensor group data, a sensor location data and a communication period data; the addressing commands C1 can set the group of the sensor S1, the location of the sensor S1 and the communication period of the communication port P1; the addressing commands C2 can set the group of the sensor S2, the location of the sensor S2 and the communication period of the communication port P2. According to the above inference, the addressing commands Cn can set the group of the sensor Sn, the location of the sensor Sn and the communication period of the communication port Pn.

Examples of the synchronization manner between the controller 10 and the plural sensors S1-Sn, the sensor S1 has a timer T1, the controller 10 can respond a delay entering time (DT1) of the sensor S1 communication period; the sensor S2 has a timer T2, the controller 10 can respond a delay entering time (DT2) of the sensor S2 communication period. According to the above inference, the sensor Sn has a timer Tn, the controller 10 can respond a delay entering time (DTn) of the sensor Sn communication period. Thus, the controller 10 can reduce the synchronization error between the time-division counter T and each of the timers T1-Tn.

What is claimed is:

1. A battery management system having capability for addressing and time-division communication, the battery management system comprising:
    a controller (10) having a time-division counter (T) and a communication port (P), the time-division counter (T) is used to provide for time counting of the controller (10);
    a plurality of sensors (S1-Sn), the sensor (S1) has a processor (M1), a battery detection circuit (D1), a communication port (P1) and a button (B1); the sensor (S2) has a processor (M2), a battery detection circuit (D2), a communication port (P2) and a button (B2); the sensor (Sn) has a processor (Mn), a battery detection circuit (Dn), a communication port (Pn) and a button (Bn);
    a communication cable assembly (W), the communication cable assembly (W) can string connect with the communication ports (P-Pn), therefore communicatively connect the controller (10) and the plural sensors (S1-Sn); and a plurality of addressing command (C1-Cn); when the controller (10) transmits the addressing command (C1), and the button (B1) is pressed, the processor (M1) will open the communication port (P1) to receive the addressing command (C1) to address the sensor (S1), therefore the processor (M1) can control a communication period of the communication port (P1) in accordance with the addressing command (C1);

when the controller (10) transmits the addressing command (C2), and the button (B2) is pressed, the processor (M2) will open the communication port (P2) to receive the addressing command (C2) to address the sensor (S2), therefore the processor (M2) can control a communication period of the communication port (P2) in accordance with the addressing command (C2);

when the controller (10) transmits the addressing command (Cn), the button (Bn) is pressed, the processor (Mn) will open the communication port (Pn) to receive the addressing command (Cn) to address the sensor (Sn), therefore the processor (Mn) can control a communication period of the communication port (Pn) in accordance with the addressing command (Cn);

wherein the sensor (S1) and the controller (10) can execute the time-division communication in accordance with the communication period of the communication port (P1); the sensor (S2) and the controller (10) can execute the time-division communication in accordance with the communication period of the communication port (P2); the sensor (Sn) and the controller (10) can execute the time-division communication in accordance with the communication period of the communication port (Pn).

2. The battery management system having capability for addressing and time-division communication of claim 1, wherein the processor (M1) used a switch (SW1) or a signal line to control the open and close of the communication port (P1), and therefore can control the communication period of the communication port (P1); the processor (M2) used a switch (SW2) or a signal line to control the open and close of the communication port (P2), and therefore can control the communication period of the communication port (P2); the processor (Mn) used a switch (SWn) or a signal line to control the open and close of the communication port (Pn), and therefore can control the communication period of the communication port (Pn).

3. The battery management system having capability for addressing and time-division communication of claim 1, wherein the content of each addressing command has a sensor location data and a communication period data; the addressing command (C1) can set the location of the sensor (S1) and the communication period of the communication port (P1); the addressing command (C2) can set the location of the sensor (S2) and the communication period of the communication port (P2); the addressing command (Cn) can set the location of the sensor (Sn) and the communication period of the communication port (Pn).

4. The battery management system having capability for addressing and time-division communication of claim 3, wherein the content of each addressing command further has a sensor group data; the addressing command (C1) can set the group of the sensor (S1), the addressing command (C2) can set the group of the sensor (S2), the addressing command (Cn) can set the group of the sensor (Sn).

5. The battery management system having capability for addressing and time-division communication of claim 1, wherein the processor (M1) can respond an acknowledging (ACK1) after the addressing command (C1) is received and saved, the controller (10) can receive and save the acknowledging (ACK1) to confirm the addressing of the sensor (S1); the processor (M2) can respond an acknowledging (ACK2) after the addressing command (C2) is received and saved, the controller (10) can receive and save the acknowledging (ACK2) to confirm the addressing of the sensor (S2); the processor (Mn) can respond an acknowledging (ACKn) after the addressing command (Cn) is received and saved, the controller (10) can receive and save the acknowledging (ACKn) to confirm the addressing of the sensor (Sn).

6. The battery management system having capability for addressing and time-division communication of claim 5, wherein the acknowledging (ACK1) has a unique identification (UID1), the unique identification (UID1) can be a product serial number of the sensor (S1); the acknowledging (ACK2) has a unique identification (UID2), the unique identification (UID2) can be a product serial number of the sensor (S2); the acknowledging (ACKn) has a unique identification (UIDn), the unique identification (UIDn) can be a product serial number of the sensor (Sn).

7. The battery management system having capability for addressing and time-division communication of claim 1, wherein the sensor (S1) has a timer (T1), the controller (10) can respond a delay entering time (DT1) of the sensor (S1) communication period; the sensor (S2) has a timer (T2), the controller (10) can respond a delay entering time (DT2) of the sensor (S2) communication period; the sensor (Sn) has a timer (Tn), the controller (10) can respond a delay entering time (DTn) of the sensor (Sn) communication period, therefore the controller (10) can reduce the synchronization error between the time-division counter (T) and each of the timers (T1-Tn).

8. The battery management system having capability for addressing and time-division communication of claim 1, wherein the controller (10) further has a button (B), when the button (B) is sequentially pressed, the controller (10) can sequentially transmit a plurality of addressing commands (C1-Cn), and therefore the pressing frequency of the button (B) can decide the total number of sensor which can be string connected to the controller (10).

9. The battery management system having capability for addressing and time-division communication of claim 1, wherein the controller (10) further has a default total number (X) of sensor, the controller (10) can sequentially transmit a plurality of addressing commands (C1-Cn) according to the addressing status of the plural sensors (S1-Sn), wherein X is from 1 to n, therefore can decide the total number of plural sensors (S1-Sn) which can be string connected to the controller (10).

10. The battery management system having capability for addressing and time-division communication of claim 1, wherein the communication port (P) of the controller (10) can further communicatively connect a manager (50), the manager (50) can be provided with a user interface (51), the user interface (51) can set a total number (X) of sensor, the total number (X) of sensor is transmitted from the manager (50) to the controller (10), the controller (10) can sequentially transmit a plurality of addressing commands (C1-Cn) according to the addressing status of the plural sensors (S1-Sn), wherein X is from 1 to n, therefore can decide the total number of plural sensors (S1-Sn) which can be string connected to the controller (10).

11. The battery management system having capability for addressing and time-division communication of claim 1, wherein the communication cable assembly (W) has a plurality of communication cables (W1-Wn), the communication cable (W1) can string connect the communication port (P) and the communication port (P1), other communication ports (P2-Pn) can be string connected by other communication cables (W2-Wn), therefore the communication cable assembly (W) can communicatively connect the controller (10) and the plural sensors (S1-Sn).

12. The battery management system having capability for addressing and time-division communication of claim 1, wherein the battery detection circuit (D1) can electrically connect a connecting port (J1), the connecting port (J1) can connect a battery detection cable (Z1), the battery detection cable (Z1) has a pair of battery detection terminals (Z1a-Z1b); the battery detection circuit (D2) can electrically connect a connecting port (J2), the connecting port (J2) can connect a battery detection cable (Z2), the battery detection cable (Z2) has a pair of battery detection terminals (Z2a-Z2b); the battery detection circuit (Dn) can electrically connect a connecting port (Jn), the connecting port (Jn) can connect a battery detection cable (Zn), the battery detection cable (Zn) has a pair of battery detection terminals (Zna-Znb).

13. The battery management system having capability for addressing and time-division communication of claim 1, wherein the battery detection circuit (D1) can electrically connect a battery detection cable (Z1), the battery detection cable (Z1) has a pair of battery detection terminals (Z1a-Z1b); the battery detection circuit (D2) can electrically connect a battery detection cable (Z2), the battery detection cable (Z2) has a pair of battery detection terminals (Z2a-Z2b); the battery detection circuit (Dn) can electrically connect a battery detection cable (Zn), the battery detection cable (Zn) has a pair of battery detection terminals (Zna-Znb).

14. A battery management system having capability for addressing and time-division communication, the battery management system comprising:
a controller (10) having a time-division counter (T) and a communication port (P), the time-division counter (T) is used to provide for time counting of the controller (10);
a plurality of sensors (S1-Sn), the sensor (S1) has a processor (M1), a string voltage measuring circuit (V1) and a communication port (P1); the sensor (S2) has a processor (M2), a string voltage measuring circuit (V2) and a communication port (P2); the sensor (Sn) has a processor (Mn), a string voltage measuring circuit (Vn) and a communication port (Pn);
a communication cable assembly (W), the communication cable assembly (W) can string connect with the communication ports (P-Pn), therefore communicatively connect the controller (10) and the plural sensors (S1-Sn); and
a plurality of addressing command (C1-Cn) transmitted from the controller (10);
wherein the processor (M1) can open the communication port (P1) to receive the addressing command (C1), if the string voltage measured by the string voltage measuring circuit (V1) is smaller than the voltage value of the addressing command (C1), the processor (M1) will accept addressing, and the processor (M1) will control the communication period of the communication port (P1) in accordance with the addressing command (C1); the processor (M2) can open the communication port (P2) to receive the addressing command (C2), if the string voltage measured by the string voltage measuring circuit (V2) is smaller than the voltage value of the addressing command (C2), the processor (M2) will accept addressing, and the processor (M2) will control the communication period of the communication port (P2) in accordance with the addressing command (C2); the processor (Mn) can open the communication port (Pn) to receive the addressing command (Cn), if the string voltage measured by the string voltage measuring circuit (Vn) is smaller than the voltage value of the addressing command (Cn), the processor (Mn) will accept addressing, and the processor (Mn) will control the communication period of the communication port (Pn) in accordance with the addressing command (Cn);
wherein the sensor (S1) and the controller (10) can execute the time-division communication in accordance with the communication period of the communication port (P1), the sensor (S2) and the controller (10) can execute the time-division communication in accordance with the communication period of the communication port (P2); the sensor (Sn) and the controller (10) can execute the time-division communication in accordance with the communication period of the communication port (Pn).

15. The battery management system having capability for addressing and time-division communication of claim 14, wherein the processor (M1) can control the open and close of the communication port (P1), and therefore can control the communication period of the communication port (P1); the processor (M2) can control the open and close of the communication port (P2), and therefore can control the communication period of the communication port (P2); the processor (Mn) can control the open and close of the communication port (Pn), and therefore can control the communication period of the communication port (Pn).

16. The battery management system having capability for addressing and time-division communication of claim 14, wherein the content of each addressing command has a sensor location data and a communication period data; the addressing command (C1) can set the location of the sensor (S1) and the communication period of the communication port (P1); the addressing command (C2) can set the location of the sensor (S2) and the communication period of the communication port (P2); the addressing command (Cn) can set the location of the sensor (Sn) and the communication period of the communication port (Pn).

17. The battery management system having capability for addressing and time-division communication of claim 16, wherein the content of each addressing command further has a sensor group data; the addressing command (C1) can set the group of the sensor (S1), the addressing command (C2) can set the group of the sensor (S2), the addressing command (Cn) can set the group of the sensor (Sn).

18. The battery management system having capability for addressing and time-division communication of claim 14, wherein the sensor (S1) has a timer (T1), the controller (10) can respond a delay entering time (DT1) of the sensor (S1) communication period; the sensor (S2) has a timer (T2), the controller (10) can respond a delay entering time (DT2) of the sensor (S2) communication period; the sensor (Sn) has a timer (Tn), the controller (10) can respond a delay entering time (DTn) of the sensor (Sn) communication period, therefore the controller (10) can reduce the synchronization error between the time-division counter (T) and each of the timers (T1-Tn).

* * * * *